(12) United States Patent
Eigler et al.

(10) Patent No.: US 6,646,250 B2
(45) Date of Patent: Nov. 11, 2003

(54) METHOD AND SYSTEM FOR INFORMATION TRANSFER AND REPLICATION BETWEEN SPATIALLY DISTINCT POINTS VIA ENGINEERED QUANTUM STATES

(75) Inventors: Donald Mark Eigler, Santa Cruz, CA (US); Christopher Paul Lutz, Felton, CA (US); Harindran Chelvasekaran Manoharan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/165,810

(22) Filed: Jun. 6, 2002

(65) Prior Publication Data

US 2002/0158187 A1 Oct. 31, 2002

Related U.S. Application Data

(62) Division of application No. 09/494,828, filed on Jan. 31, 2000, now Pat. No. 6,441,358.

(51) Int. Cl.[7] .............................................. H01L 31/00
(52) U.S. Cl. ............................... 250/214.1; 250/214 LS
(58) Field of Search ....................... 250/214.1, 214 LS, 250/214 A, 214 LA; 359/117, 118, 146–154, 180, 181, 244–252, 275, 285; 455/14, 23, 523; 372/12, 19, 54, 95, 96, 98

(56) References Cited

U.S. PATENT DOCUMENTS

| | | | |
|---|---|---|---|
| 4,205,268 A | 5/1980 | Eerkens | 455/620 |
| 4,912,531 A | 3/1990 | Reed et al. | 357/12 |
| 4,942,437 A | 7/1990 | Fowler et al. | 357/16 |
| 4,987,312 A | 1/1991 | Eigler | 250/492.3 |
| 5,144,148 A | 9/1992 | Eigler | 250/492.3 |
| 5,166,919 A | 11/1992 | Eigler | 369/126 |
| 5,233,205 A | 8/1993 | Usagawa et al. | 257/23 |
| 5,307,410 A * | 4/1994 | Bennett | 380/256 |
| 5,323,376 A | 6/1994 | Eigler | 369/126 |
| 5,656,821 A | 8/1997 | Sakuma | 257/14 |
| 5,694,059 A | 12/1997 | Wada et al. | 326/62 |

\* cited by examiner

*Primary Examiner*—Que T. Lee
(74) *Attorney, Agent, or Firm*—Marc D. McSwain

(57) ABSTRACT

A system and method for transferring information between spatially distinct points by modulating quantum states operatively coupling at least one transmitter and at least one receiver. In the preferred embodiment, fabrication of an elliptical quantum corral resonator on a length scale on the order of the electron wavelength enables the engineering of substantially confined quantum states as desired. A transmitter preferably located at a wavefunction antinode affects a modulation in the quantum states, and a receiver preferably located at a different wavefunction antinode detects the affected modulation in the spatially distributed quantum states. A second exemplary embodiment exploits the orthogonality of quantum wavefunctions to enable multiple channels of information to be transferred simultaneously through the same volume of space without crosstalk. Additional embodiments enable combinational processing of transferred information, which may be in any format, e.g. analog, digital, or any combination thereof.

20 Claims, 19 Drawing Sheets

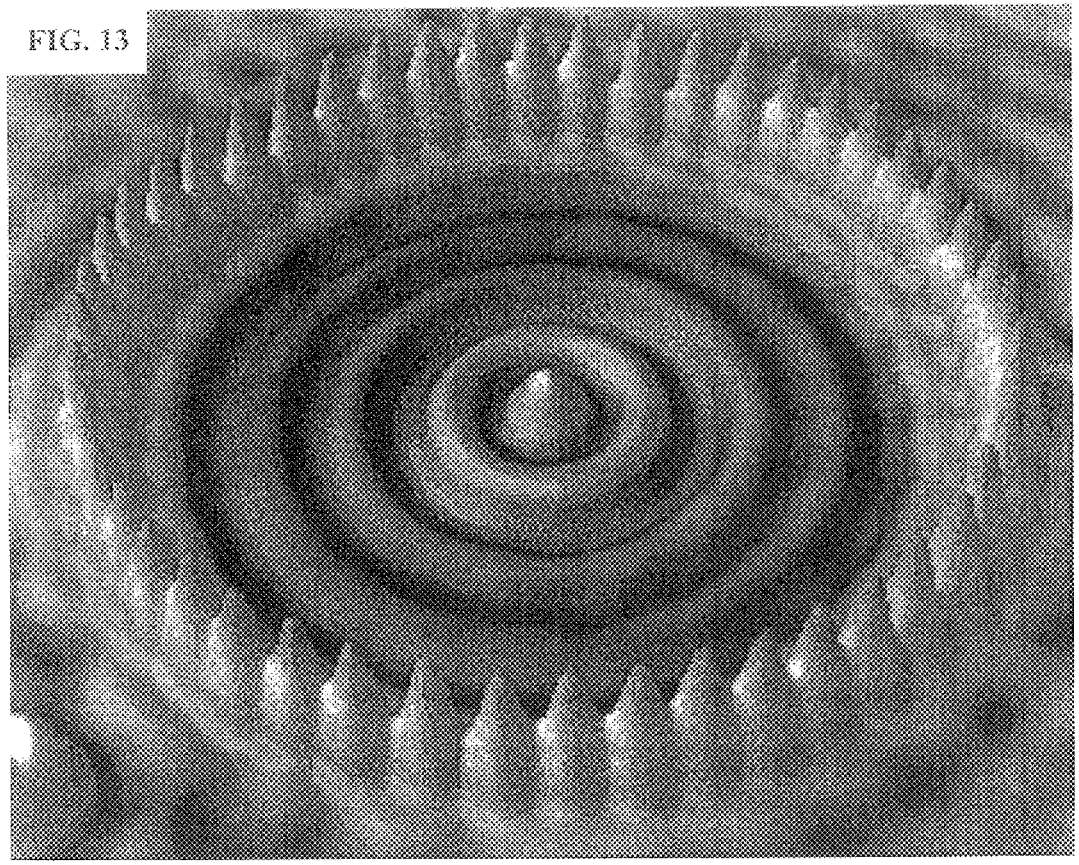

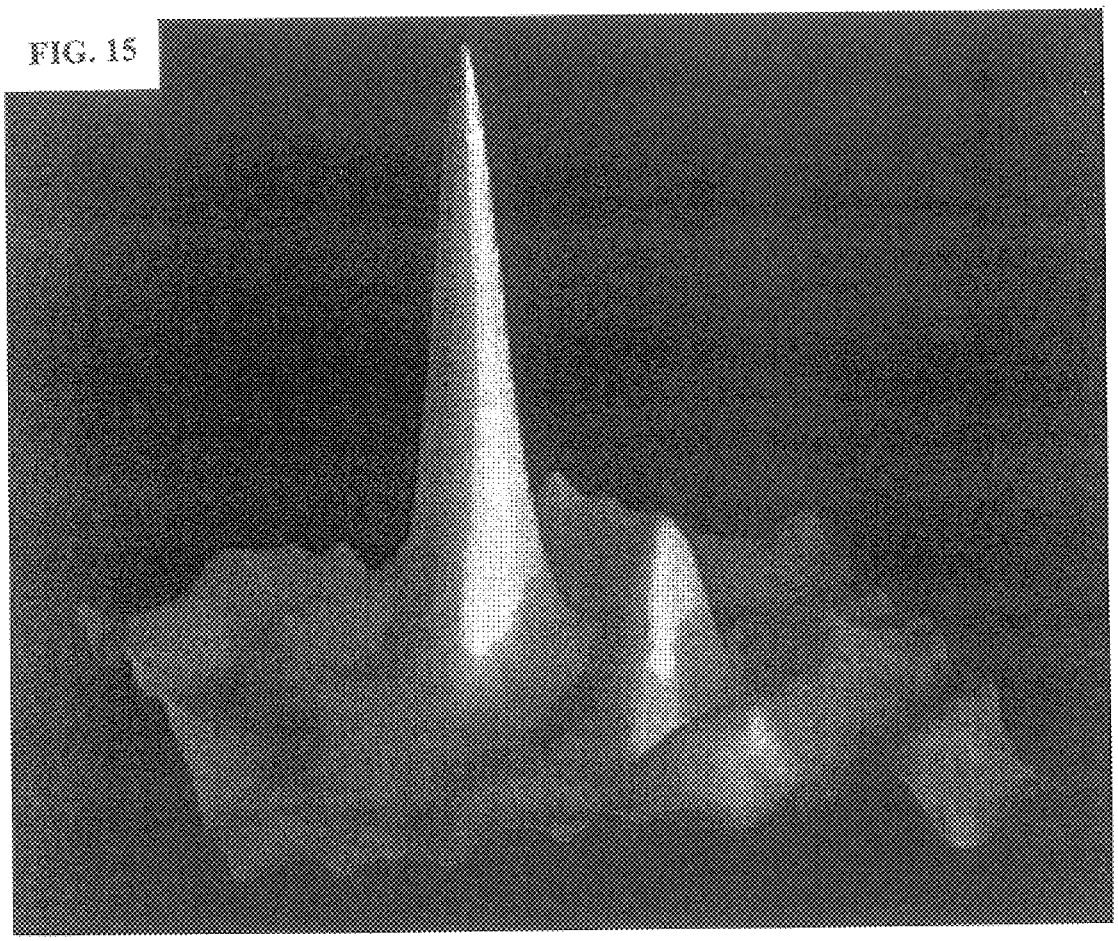

1800

FIG. 19
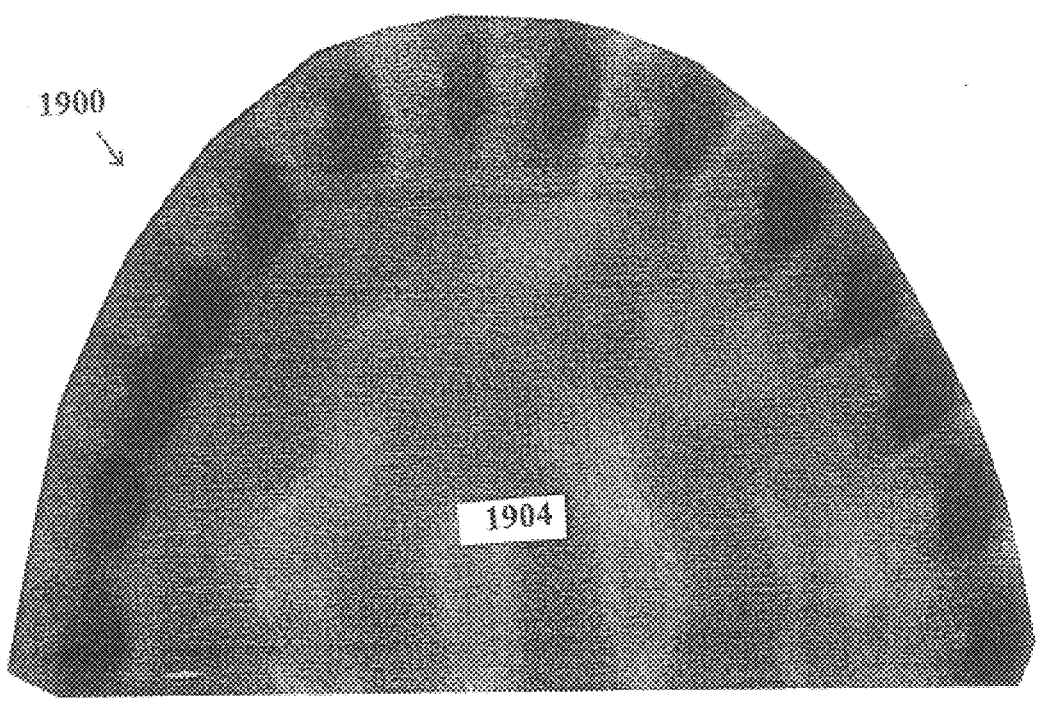
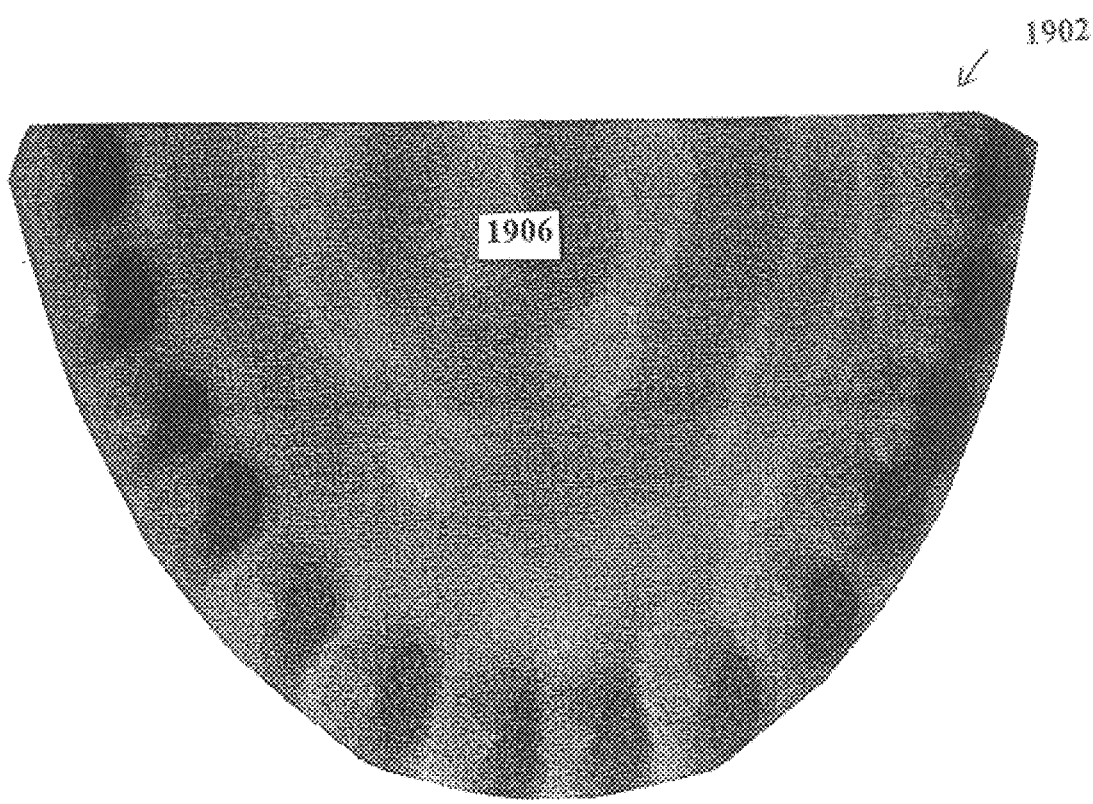

METHOD AND SYSTEM FOR INFORMATION TRANSFER AND REPLICATION BETWEEN SPATIALLY DISTINCT POINTS VIA ENGINEERED QUANTUM STATES

This is a Divisional of U.S. Ser. No. 09/494,828 filed on Jan. 31, 2000 now U.S. Pat. No. 6,441,358.

BACKGROUND OF THE INVENTION

1. Field of the Invention

The present invention generally relates to a system and method for communication, and more particularly to a system and method for transferring and replicating information between spatially distinct points using engineered quantum states.

2. Description of the Related Art

Efficient and reliable transfer of information is crucial to the preservation of knowledge and the advancement of progress. Contemporary computers, which play an invaluable role in this area, are capable of increasingly rapid information processing primarily through the downscaling of their constituent integrated circuitry. This well-defined evolutionary process has engendered phenomenal progress in information technology during the last few decades. However, the current trend of shrinking conventional semiconductor-based technology cannot continue indefinitely.

At the heart of present-day electronics are semiconductor devices which, although microscopic, nonetheless operate by controlling the flow of electrical currents along circuit paths defined by wires and other conducting areas. In one analogy, electrons are essentially shoved into one end of a conducting interconnection and emerge from another end like water in a garden hose. Conventional electronic devices are much larger than the wavelengths of the electrons comprising the currents steered through them, so quantum effects are generally ignored. However, because present scaling trends will soon demand device sizes that approach the electron wavelength limit, the full wave nature of electrons must be considered and will play an increasingly vital role in device operation and performance.

Therefore, given this view of the inherent limitations on conventional semiconductor-based electronics, new systems and methods for information transfer that rely on, rather than ignore, the quantum nature of electrons are critically needed.

SUMMARY OF THE INVENTION

It is an object of the present invention to provide a system and method for transferring information between spatially distinct points without requiring the usual wiring and current transfer of conventional electronics.

It is a further object of the present invention to provide structures fabricated on a sufficiently small length scale (on the order of the electron Fermi wavelength) to enable the engineering of confined quantum states as desired.

It is a further object of the present invention to modulate these quantum states, for example by perturbing the electronic potential at a particular location, thereby encoding information into the quantum states. If the modulation frequency is lower than the frequency corresponding to the damping time of the structures, the quantum states may be modulated adiabatically, thus enabling information transmission without power dissipation.

It is a further object of the present invention to couple the perturbation (or a localized quantum response thereto) with quantum states guided throughout the structure. The invention then selects and focuses the distributed quantum states for detection at a location spatially distinct from the modulation point. The detection of the modulating information is performed specifically through the wave nature of the quantum states, versus mere electrical current flow as with existing devices. The information transferred is not limited to a given format, i.e. it may be analog, digital, or any combination thereof.

It is a further object of the present invention to exploit the orthogonality of quantum wavefunctions to enable multiple channels of information to be transferred simultaneously through the same volume of space without crosstalk. Further, information may be transferred in either direction, that is, both to and from both the modulation point and the detection point, simultaneously, as there is no inherent directionality to a quantum state.

It is a further object of the present invention to provide structures enabling logic functions and memory operations to be performed on the transmitted information.

The structure is preferably a resonator designed to have two antinodes, which are spatial locations where the electron density distribution is relatively large. If a transmitter (which is anything that affects a modulation in a quantum state) is placed at a first antinode and a receiver (which is anything sensitive to a modulated aspect of a quantum state) is placed at a second antinode, information transfer between the transmitter and receiver is optimized because the modulation affected at the receiver by the transmitter is maximized. Conversely, a transmitter located at a node (spatial location where a quantum state's density distribution is zero) will have minimal ability to modulate a quantum state and therefore minimal ability to transmit a signal to a receiver. Similarly, a receiver placed at a node of a quantum state will detect very little modulation of the quantum state and hence have minimal ability to receive a signal.

Alternately, structures may be designed with more than one transmitter and more than one receiver. Changes to the physical structure of the resonator may also modulate the quantum states available for information transmission. Furthermore, the quantum states used for communication need not even be occupied to be modulated.

In the preferred embodiment of the present invention, the structure for communicating information is an elliptically-shaped quantum corral assembled from cobalt atoms on a conductive copper substrate. The transmitter is preferably a cobalt atom positioned at the first focus of the ellipse. The receiver is preferably a scanning tunneling microscope (STM) tip positioned above the second focus of the ellipse. The geometric properties of the ellipse project the particular quantum mechanical signature (e.g. Kondo resonance) of the cobalt atom at the first focus onto the second, empty focus. In effect, a phantom image or "mirage" of the real cobalt atom appears at the receiver at the second focus and influences the receiver in a manner very similar to what would result from a cobalt atom actually existing at the receiver. In this case, the receiver detects a strong dip in tunneling conductance at the second focus, indicating the presence of the cobalt atom at the first focus. An electron reservoir is usually necessary to allow the invention to be operated more than once.

The invention is not limited to this structure or modulation method, however. Theoretically, a single atom could serve as the transferring structure because its electrons are confined to quantum states that could be modulated on one side of the atom and detected on the other side of the atom, or on the other side of the universe. In that case, quantum states are engineered by selecting a particular atom and the specific energy levels to be modulated.

The present invention thus provides a unique and nonobvious structure and method which overcome the limitations of conventional microelectronics, and embody a new paradigm for information transfer.

BRIEF DESCRIPTION OF THE DRAWINGS

FIG. 13 is a topographic STM image of a circular quantum corral resonator according to a second embodiment of the invention;

FIG. 15 is an STM image of cross-channel communication using orthogonal eigenmodes of the circular quantum corral resonator according to the second embodiment of the present invention;

FIG. 19 is a schematic diagram of a pair of parabolic electron reflectors forming a communication system according to a fourth embodiment of the present invention.

Like numbers indicate like parts throughout the several views.

DETAILED DESCRIPTION

An electronic quantum state may be extended in space. Its energy and probability distribution are uniquely determined by the global potential that it samples. A local change in potential at one point can alter or perturb the quantum state in a measurable way. Generally, if the quantum wavefunction is extended over distances larger than the size of the local change in potential, this perturbation can be detected at a remote location where the probability distribution of the quantum state is sufficiently large. At this new location, the original change in potential could be directly undetectable, but may be indirectly determined by querying the extended quantum wavefunction that samples both locations simultaneously.

Figure 1:
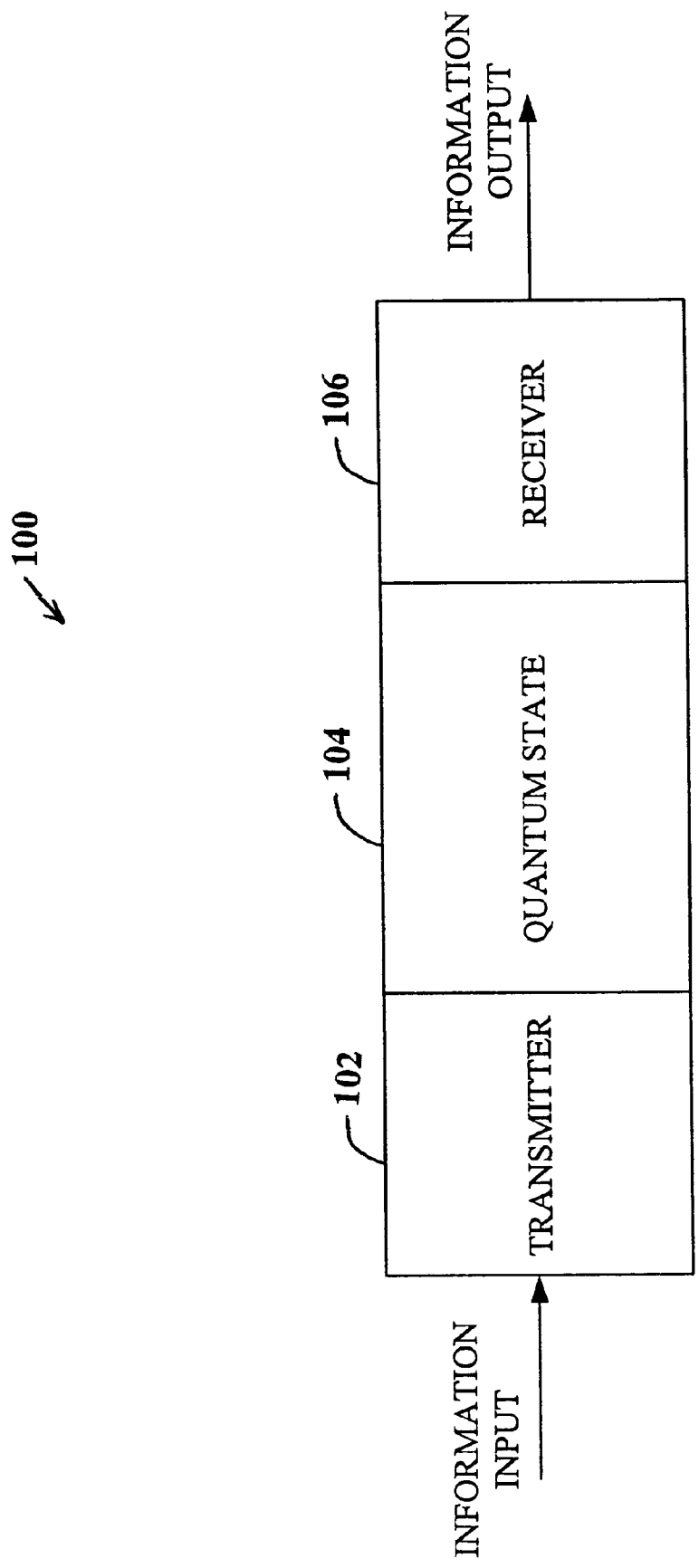
FIG. 1 is a schematic diagram of a communication system using a quantum state to transfer information between a transmitter and a receiver according to a preferred embodiment of the present invention.

Referring now to FIG. 1, a schematic diagram is shown of a communication system using a quantum state to transfer information between two or more spatially distinct points according to a preferred embodiment of the present invention. System 100 does not require the usual wiring and current transfer of conventional electronics; rather, the system of the present invention utilizes the quantum wave nature of electrons per se for transmission and reception of information.

In the present invention, information to be transferred begins its journey at transmitter 102, which may be any physical entity that locally affects a modulation in a quantum state 104. For example, transmitter 102 may perturb the electronic potential at a particular point in space, thereby encoding information by modulating quantum state 104. Alternately, transmitter 102 may affect the density distribution, spin (magnetic moment), or occupancy of quantum state 104. Transmitter 102 is thus coupled to quantum state 104 (or a localized quantum response to the modulation of quantum state 104) which is distributed throughout system 100. A modulation of quantum state 104 will generally be manifest throughout the volume of space in which quantum state 104 exists both before and after the modulation caused by transmitter 102. Quantum state 104 may be thought of as the "medium" carrying the information.

System 100 then selects and focuses modulated quantum state 104 for detection at a location spatially distinct from the modulation point. Receiver 106 may be any physical entity which is locally sensitive to some aspect of quantum state 104. For purposes of the present invention, by "locally" it is meant that transmitter 102 does not directly influence receiver 106 but instead influences quantum state 104. Receiver 106 detects the modulation originally affected by transmitter 102 and outputs the information transferred. Transmitter 102 and receiver 106 are thus operatively coupled together via quantum state 104 even though spatially separated. The present invention is not limited to any specific format of information being transferred, i.e. it may be analog, digital, or any combination thereof. A preferred embodiment of the invention uses a two-point geometry that allows for one source and one destination, but the geometry may be extended to multiple source and destination locations.

There are many known methods and means to create potentials, typically in a solid or on the surface of a solid, which result in a quantum state 104 for one or more electrons. For example, the core electron states of the atoms that compose a solid are a set of quantum states 104. Another example is the set of quantum states 104 of electrons in a semiconductor heterostructure which are first confined to a two-dimensional layer due to the layering of the heterostructure, and then further confined to discrete states by suitably designed electrodes in the heterostructure. Further examples are the quantum states 104 of a molecule and the quantum states 104 of a quantum dot.

Another example of a structure for producing specific quantum states 104 is a "quantum corral", as known conventionally, which is an arrangement of atoms or molecules designed to substantially confine electrons. Quantum corrals are built on the surface of certain materials which, due to the inherent electronic nature of the material and surface characteristics, have electrons which form a two-dimensional electron gas on the surface of the materials. These electrons may be further confined by creating an electron scattering potential which limits these electrons in the plane of the surface. The scattering potential may be produced by atoms on the surface, step edges, defects, and by other means readily apparent to those skilled in the art. Further, the invention is not limited to two-dimensional structures.

Figure 2:
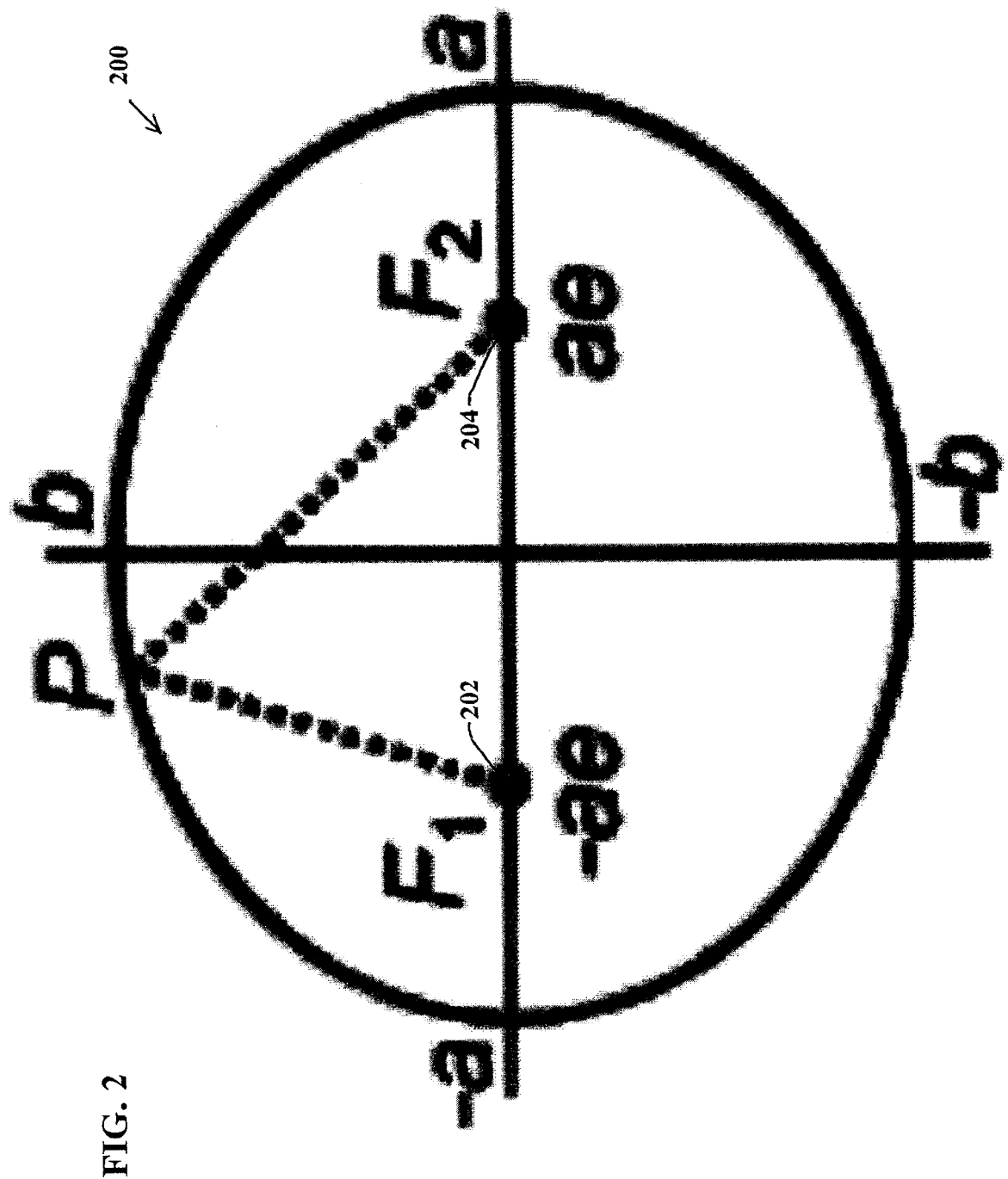
FIG. 2 is a schematic diagram of an ellipse.

Referring now to FIG. 2, a schematic diagram of an ellipse 200 is shown. Ellipse 200 is a locus of points P wherein the sum of the distance of each point P from two fixed points F1 and F2 is a constant. The two fixed points of ellipse 200 are a left focus 202 and a right focus 204. Ellipse 200 may be described by an eccentricity e and a semimajor length a.

Figure 3:
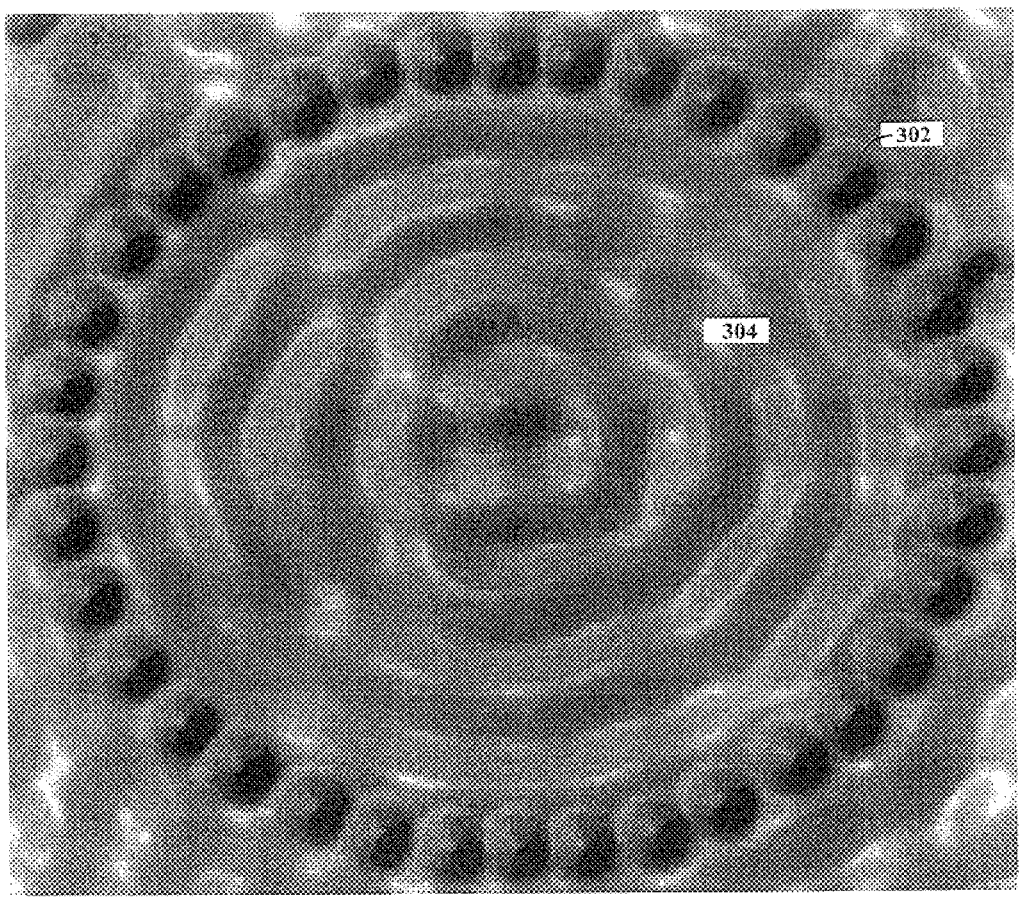
FIG. 3 is a topographic scanning tunneling microscope (STM) image of an elliptical quantum corral resonator according to a preferred embodiment of the present invention.

Referring now to FIG. 3, a topographic STM image of an elliptical quantum corral or resonator 300 according to a preferred embodiment of the present invention is shown. Resonator 300 is fabricated on a sufficiently small length scale (on the order of the electron Fermi wavelength) to enable the engineering of quantum states 104 as desired. An STM preferably positions atoms 302 to form the walls of resonator 300 in the shape of ellipse 200; alternately, molecules or etched surfaces may form the walls. In an exemplary implementation of the invention, resonator 300 includes 36 individual cobalt atoms 302 positioned on the [111] surface of a copper substrate. Resonator 300 of FIG. 3 has an eccentricity of 0.5 and a semimajor axis of 71.3 Angstroms (Å). The size and shape of resonator 300 are specifically designed to result in quantum states 104 near the Fermi level of the underlying copper having two antinodes (spatial locations at which the distribution density is high). Resonator 300 harbors approximately 100 resonating electrons.

The bulk conduction electrons and the electrons in the surface states of the conductive copper substrate serve as an electron reservoir 304. An electron reservoir 304 is usually necessary to allow the invention to be operable more than once. Quantum state 104 should be weakly coupled to electron reservoir 304 in order to, for example, re-establish the occupancy of quantum state 104 by either filling or emptying quantum state 104 after quantum state 104 is read out by receiver 106. The coupling to electron reservoir 304 should not be strong enough to destroy the conditions which give rise to a discrete set of quantum states 104. Electron reservoirs 304 may also be tunnel barriers which leak electrons into quantum states 104 in semiconductor heterostructures. Transmitters 102 and receivers 106 may also serve as electron reservoirs 304. For certain conditions, electrons occupying other quantum states 104 of resonator 300 could serve as electron reservoir 304, especially if they are themselves connected to an electron reservoir 304. If the modulation frequency of quantum states 104 is lower than the frequency corresponding to the damping time of resonator 300, quantum states 104 may be modulated adiabatically, thus enabling information transmission without power dissipation. Some minimal power dissipation may be required for reception, however.

Receiver 106 may be designed to utilize the exclusion principle to characterize quantum state 104. Such a receiver 106 would attempt to impose a spin or energy transition upon quantum state 104; if such a transition occurs, that would signify for example a logic "1", otherwise the exclusion principle would not allow such a transition to occur, signifying a logic "0". In this way, no electron reservoir 304 would be required.

Transmitter 102 may be formed, for example, by a suitably patterned electrode on a semiconductor heterostructure, by an atom or group of atoms placed on the boundary, interior, or exterior of a quantum corral which affects quantum state 104 of the corral, by an electrode for applying an electric field, by a local magnetic field, or by an atom with a spin or magnetic moment. There may be one or more transmitters 102 per quantum state 104, and there may be one or more quantum states 104 per transmitter 102.

Receiver 106 may be a tunnel barrier or local lowering of the confining potential through which an electron may move while transitioning out of quantum state 104, or an atom or group of atoms which undergo an identifiable change due to an alteration in quantum state 104 in the vicinity of the atom or group of atoms, or any means for locally probing quantum state 104 such as the tip of an STM. As with transmitters 102, there may be one or more receivers 106 per quantum state 104, and there may be one or more quantum states 104 per receiver 106. Receiver 106 may even be the same physical entity or part of transmitter 102.

Figure 4:
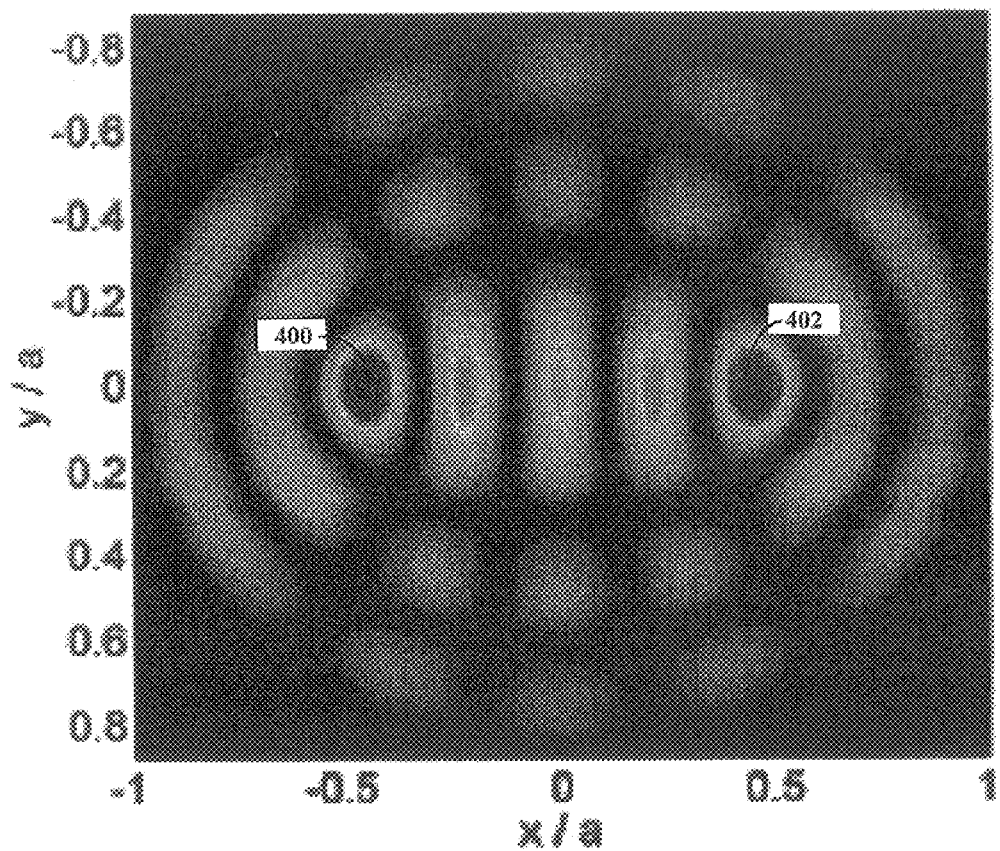
FIG. 4 is a schematic diagram of the eigenmodes of the elliptical quantum corral resonator according to a preferred embodiment of the present invention.

Referring now to FIG. 4, a schematic diagram of the eigenmodes of resonator 300 of FIG. 3 is shown, according to a preferred embodiment of the present invention. These eigenmodes may be calculated using a hard-wall box approximation for resonator 300. The particular size and shape of resonator 300 produces distinct probability density amplitude peaks 400 and 402 at or near the Fermi energy $E_F$ (V=0) to resonate confined electrons. These probability peaks are very near the classical foci (202 and 204) of ellipse 200, and are important for the information transfer example described below.

Information is preferably propagated by system 100 in a specific region of space using a quantum state 104 having a probability distribution that is peaked in two or more distinct points that are spatially well-separated from each other. Quantum state 104 may be modulated only at places where the wavefunction is nonzero, and the extent of the modulation depends largely upon the magnitude of the state density at the modulation point. For example, a negative electrical potential may be applied at a location corresponding to peak 400 in the density distribution of quantum state 104

(corresponding to left focus 202 in FIG. 2). The density distribution at left focus 202 is thereby reduced, hence modulating quantum state 104. The effect of such an applied potential is large wherever the density distribution is large, such as at peaks 400 and 402.

Generally, therefore, placement of a transmitter 102 at one such peak results in a large modulation of quantum state 104. Placement of a receiver 106 at another such peak results in a large signal being detected by receiver 106. Thus, information transfer between transmitter 102 and receiver 106 is optimized because the modulation affected at receiver 106 by transmitter 102 is maximized. Similarly, noise sources located at nodes (spatial locations where the density distribution is zero) will have minimal influence on the communication between transmitter 102 and receiver 106 because quantum state 104 cannot be modulated at a node.

Figures 5A, 5B:
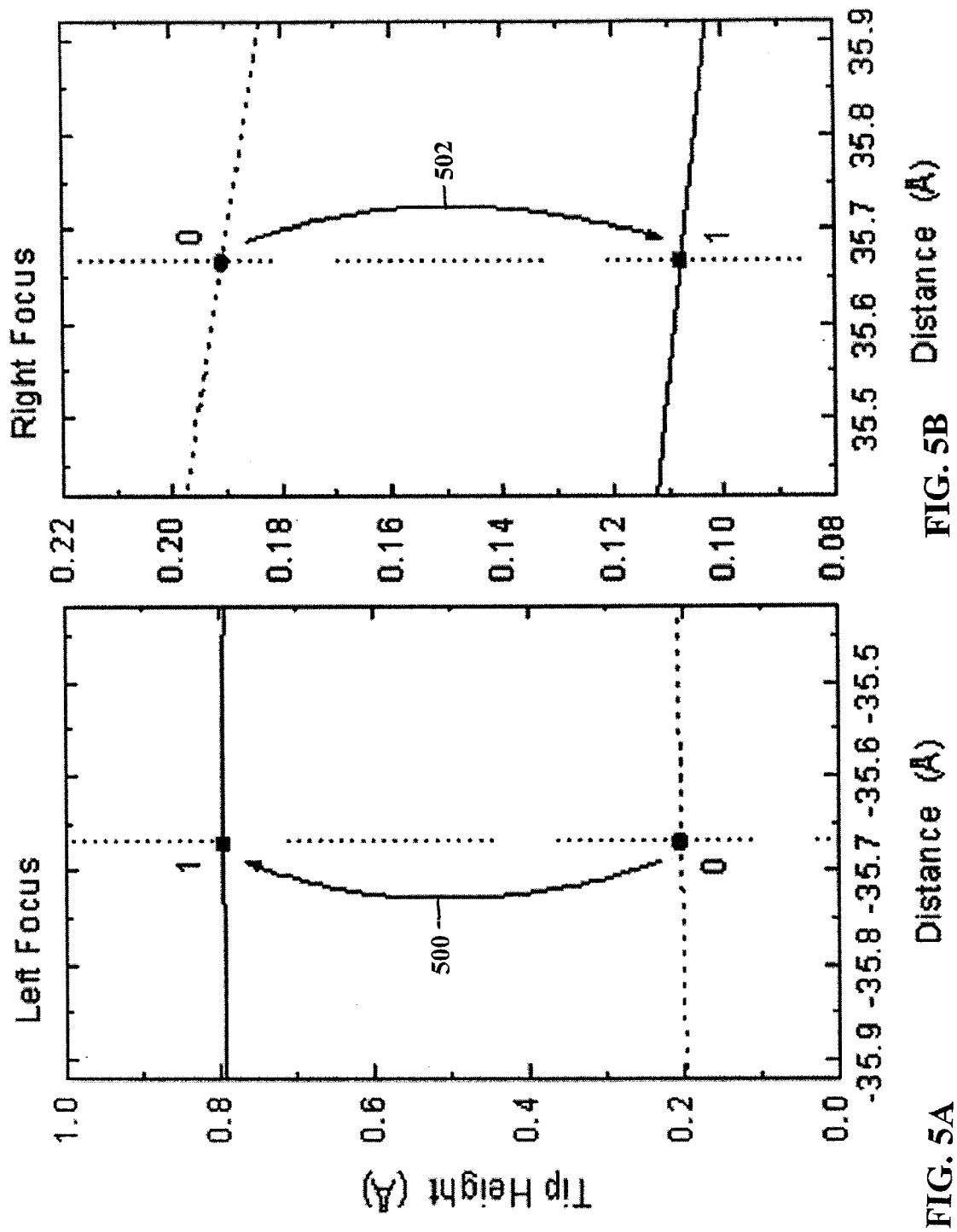
FIGS. 5A and 5B are plots of STM tip height depicting transmission of digital information between the foci of the elliptical quantum corral resonator using an atom placed at a focus (5A) and away from a focus (5B)

Referring now to FIGS. 5A and 5B, plots of STM tip height versus distance along the major axis of resonator 300 are shown as examples of digital information transfer. The information source is at left focus 202 (dotted vertical line in FIG. 5A) and the information destination is at right focus 204 (dotted vertical line in FIG. 5B). Transmitter 102 is implemented in the preferred embodiment of the present invention by placing a cobalt atom on the substrate surface of resonator 300 at its left focus 202. An STM tip positioned directly over transmitter 102 will typically be 0.8 Å above the substrate to maintain the constant current value used in the experiment, versus the 0.2 Å STM tip height typically needed to maintain the same constant current value when there is no transmitter 102 present.

The scattering of surface state electrons at left focus 202 creates a node in quantum state 104 at left focus 202. Quantum state 104 is significantly perturbed by placing a node-creating atom at what would otherwise be an antinode in quantum state 104. This perturbation is apparent wherever the density distribution is large, i.e. at antinodes of quantum state 104.

An exemplary receiver 106 is implemented by placing an STM tip over right focus 204 of resonator 300. The presence of the atom at left focus 202 may be detected by measuring the density of quantum state 104 at right focus 204. The STM tip height above the substrate at right focus 204 required to maintain a constant current value varies with the density of quantum state 104 at right focus 204. When an atom is positioned at left focus 202, it repels electrons and thus lowers the density distribution at right focus 202. The STM tip over right focus 202 must therefore be lowered closer to the substrate to maintain the constant current value.

Changes in the STM tip heights required to maintain a constant current value as shown in FIGS. 5A and 5B may represent changes in logic values due to perturbation of quantum state 104. The first logic state ("0" or "1") 500 at left focus 202 is detected by the tip height value at right focus 204 and determines the second logic state 502 at right focus 204. Logic "0" states (e.g., dashed lines) correspond to no atom existing at left focus 202, and logic "1" states (e.g., solid lines) correspond an atom existing at left focus 202. In other words, right focus 204 of resonator 300 is empty in this example, but when probed it reveals the state of left focus 202 of resonator 300. Such information transfer by quantum state 104 modulation does not require intricate interconnection wiring as with conventional electronics. Scaling can therefore proceed downward to atomic dimensions.

Further, the information transferred is not restricted to binary values, e.g. the two tip specific STM height states 500 and 502 shown in FIGS. 5A and 5B. The position of the atom at left focus 202 maps a range of input values to a range of output values at right focus 204. This corresponds to and enables a multi-state digital information transfer. Additionally, the local potential at left focus 202 may be modulated continuously (e.g., by changing the voltage on a gate), in which case the information transferred will be analog. Thus, the present invention allows for both digital and analog information transfer depending upon the local potential placed on one of the resonator 300 foci. Additionally, the presence or absence of an atom at a focus of resonator 300 may serve as a one bit memory function. Further details of the experimental implementation of this aspect of the present invention are described by the next several figures, and in a journal article scheduled for publication in *Nature* on Feb. 3, 2000 (volume 403, pages 512–515) and included as an Appendix and incorporated herein by reference.

Figure 6:
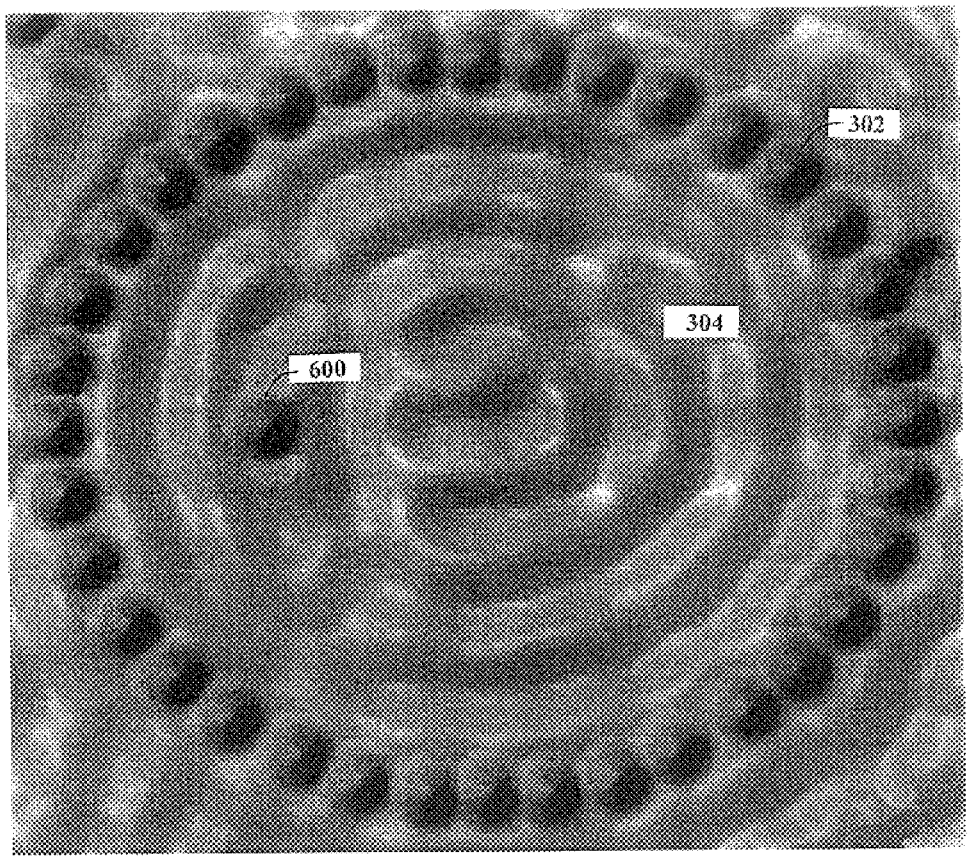
FIG. 6 is a topographic STM image of the elliptical quantum corral resonator having an atom placed at a focus corresponding to FIG. 5A according to a preferred embodiment of the present invention.

Referring now to FIG. 6, a topographic STM image of resonator 300 having a cobalt atom 600 at left focus 202 is shown, according to the preferred embodiment of the present invention. Cobalt atoms 600 on the [111] copper surface exhibit the Kondo effect, which is a many-body resonance occurring when conduction electrons align their spins to screen the localized magnetic moment of cobalt atom 600. The Kondo resonance of cobalt atom 600 may be used to impress a unique spectroscopic signature upon quantum state 104, with that signature then being detected elsewhere by measuring the energy dependence of the density of quantum state 104 at the remote location. The invention is not limited to the use of cobalt atoms, or other atoms exhibiting the Kondo effect; however, the Kondo effect results in a sharp suppression in differential conductivity dI/dV of particular utility.

Figure 7:
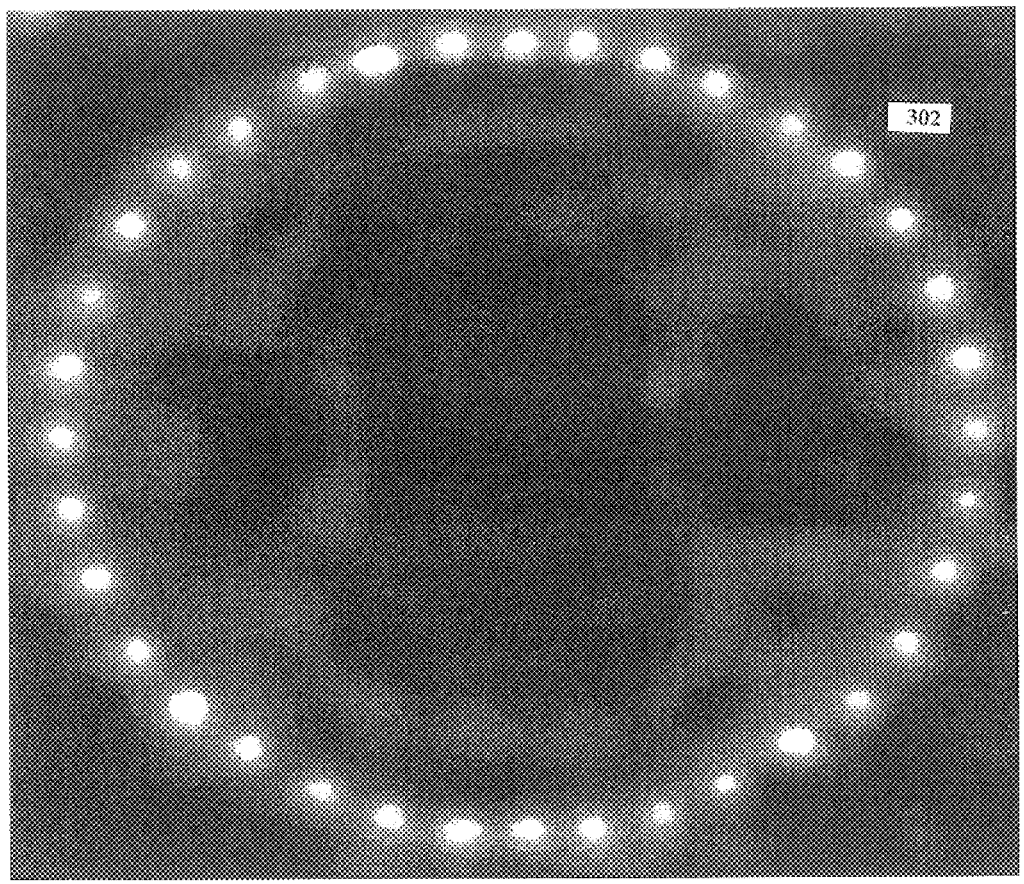
FIG. 7 is a conductivity image of the empty elliptical quantum corral resonator according to a preferred embodiment of the present invention.

Referring now to FIG. 7, a conductivity image of empty resonator 300 is shown, according to a preferred embodiment of the present invention.

Figure 8:
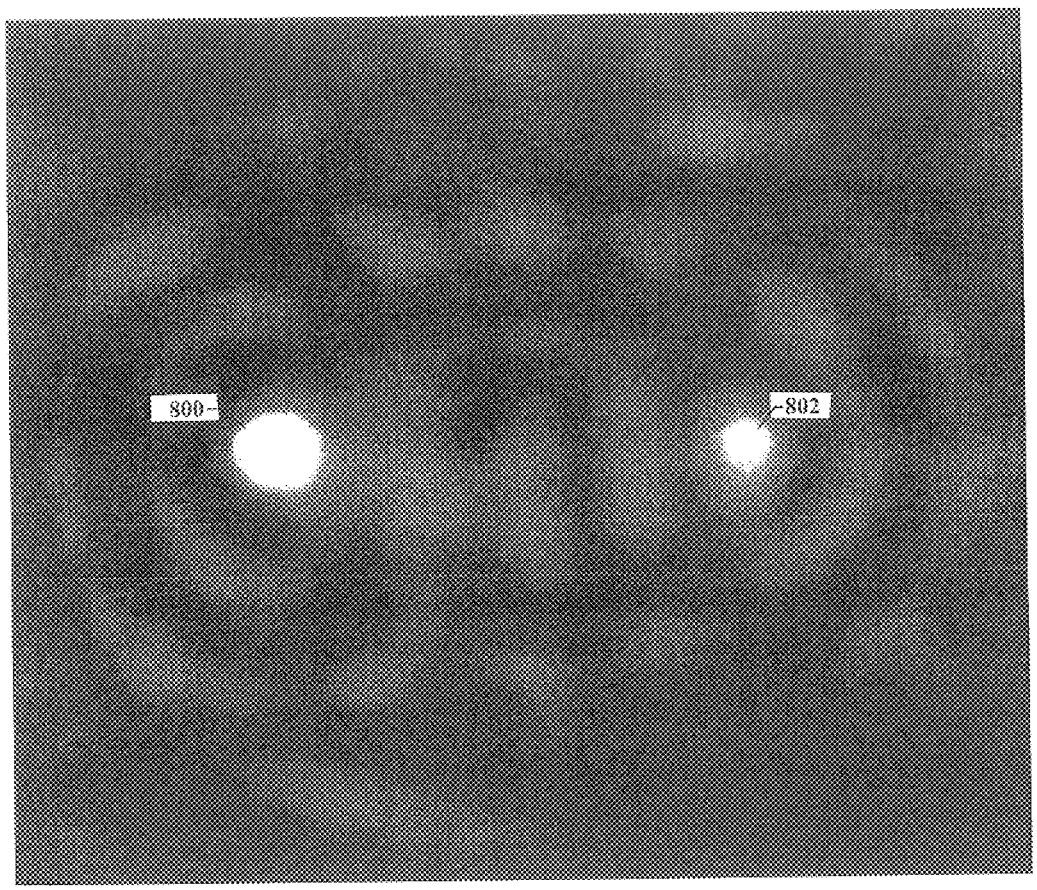
FIG. 8 is a conductivity image of the elliptical quantum corral resonator having an atom placed at a focus corresponding to FIG. 5A and FIG. 6 according to a preferred embodiment of the present invention.

Referring now to FIG. 8, a conductivity image of resonator 300 having a cobalt atom 600 placed at left focus 202 corresponding to FIG. 6 is shown, according to a preferred embodiment of the present invention. The background image of empty resonator 300 from FIG. 7 has been subtracted away to more clearly depict the influence of transmitter 102 (atom 600 at left focus 202) on conductivity. Transmitter 102 produces a strong dip in tunneling conductance dI/dV as a function of sample bias V, centered around the Fermi energy of the copper substrate (V=0). The Kondo resonance may thus be detected spectroscopically by measuring the differential conductance dI/dV close to the Fermi energy. Conductance images may be taken simultaneously with topographic images by applying a small ac modulation voltage to the dc bias, in order to obtain a spatial map of the Kondo spectral signature.

The Kondo signature is shown by the bright regions 800 and 802 in the image of FIG. 8. A large Kondo resonance 800 is spatially centered on transmitter 102 at left focus 202 of resonator 300 and dissipates over a lateral length scale of about 10 Å. A smaller Kondo resonance 802 is spatially centered on right focus 204 of resonator 300. The invention therefore uses the strong and distinct spectroscopic features of the Kondo effect as an "image source" and uses the geometric properties of ellipse 200 to project the spectroscopic Kondo signature of transmitter 102 at one focus (202) onto the opposite, empty focus (204). In effect, a phantom image or "mirage" of real cobalt atom 600 has been projected across resonator 300 and appears as smaller Kondo resonance 802. The invention produces a faithful spectroscopic replica (e.g., a "virtual atom") of the real cobalt atom 600 at the opposite focus (204) such that the resonance widths (e.g., implied Kondo temperatures) are equivalent. The present invention thus allows remote probing of cobalt atom 600 by measuring its spatially separated spectroscopic mirage or virtual replica.

Figure 9:
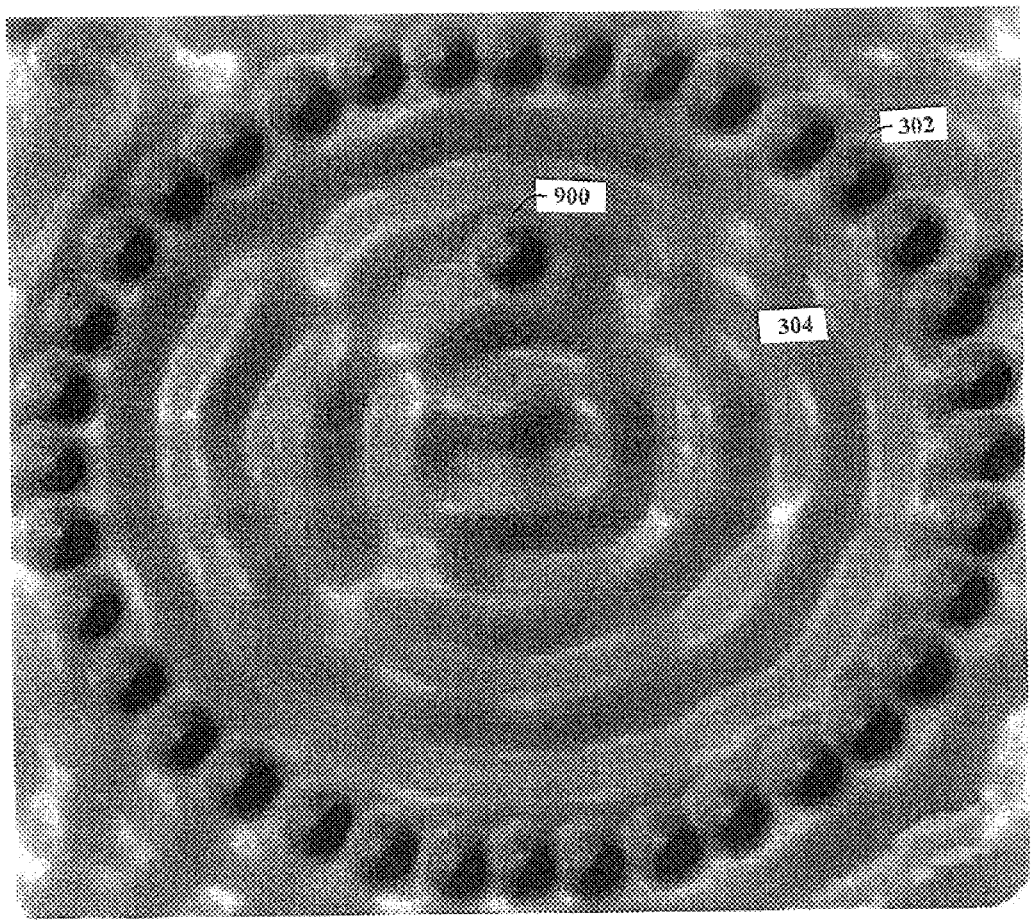
FIG. 9 is a topographic STM image of the elliptical quantum corral resonator having an atom placed away from a focus.

Referring now to FIG. 9, a topographic STM image of resonator 300 having a cobalt atom 900 placed away from left focus 202 is shown.

Figure 10:
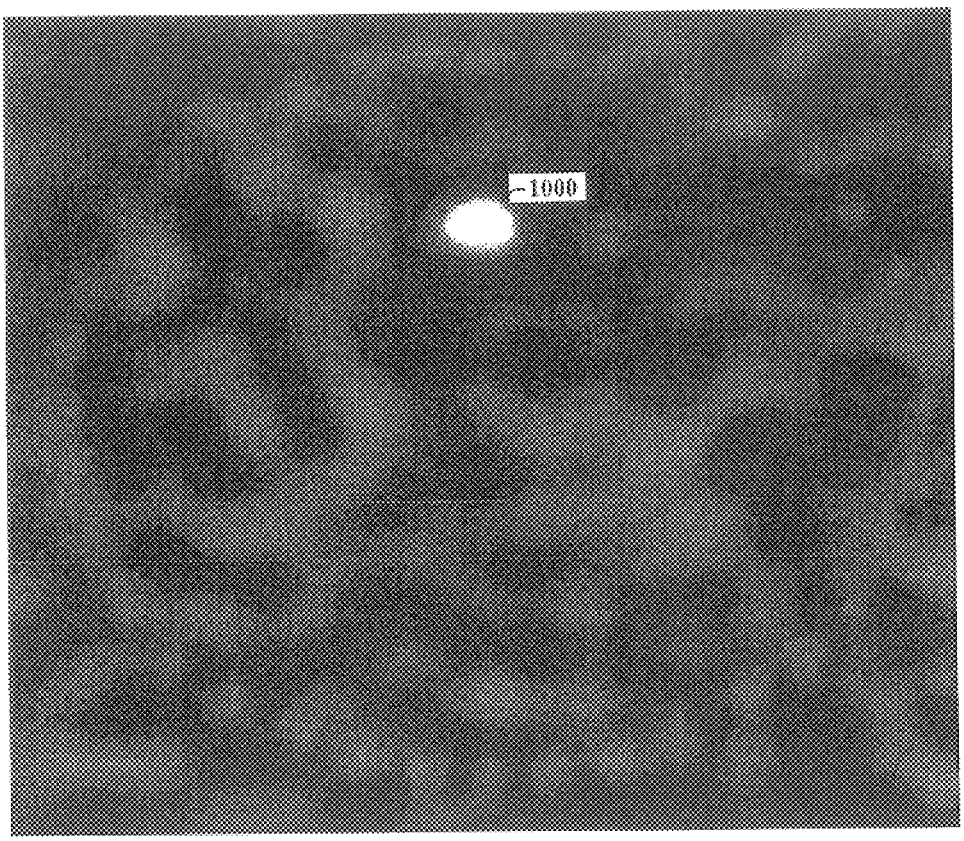
FIG. 10 is a conductivity image of the elliptical quantum corral resonator having an atom placed away from a focus corresponding to FIG. 8.

Referring now to FIG. 10, a conductivity plot of resonator 300 having a cobalt atom 900 placed away from left focus 202 corresponding to FIG. 9 is shown. The background image of empty resonator 300 from FIG. 7 has again been subtracted away to more clearly depict the influence of cobalt atom 900 on conductivity. From this image, it is clear that because cobalt atom 900 is placed away from either of the foci (202 and 204), no image replica of cobalt atom 900 will be projected across resonator 300. Only the Kondo signature of cobalt atom 900 itself is apparent as bright spot 1000.

To recap, FIGS. 5 through 9 illustrate an embodiment combining analog and digital information transfer within a resonator. In each instance, a cobalt atom is placed inside the resonator, a simultaneous constant-current topograph and dI/dV map are acquired, and the background dI/dV map (FIG. 7) is subtracted to obtain dI/dV difference images (FIGS. 8 and 10) showing the sensitivity to the Kondo resonance. FIGS. 6 and 8 illustrate that when a cobalt atom is placed at a focus of the ellipse, a Kondo resonance appears both at the occupied focus and at the empty focus. The resonator couples the two foci in a manner permitting transmission of the spectral information at the occupied focus (the transmitter) to the empty focus (the receiver). Thus, the spectral signature can be viewed as analog information being transferred between the two foci. In addition, the transmission may be digitally modulated by moving the cobalt atom off focus. This condition is illustrated in FIGS. 9 and 10, in which only the Kondo resonance at the transmitter appears. This modulation may also be implemented by modifying the magnetic characteristics of the transmitter atom. For example, a second cobalt atom may be bound to the transmitter atom to form a nonmagnetic dimer, in which case the Kondo signature at the destination focus is also extinguished.

Figure 11:
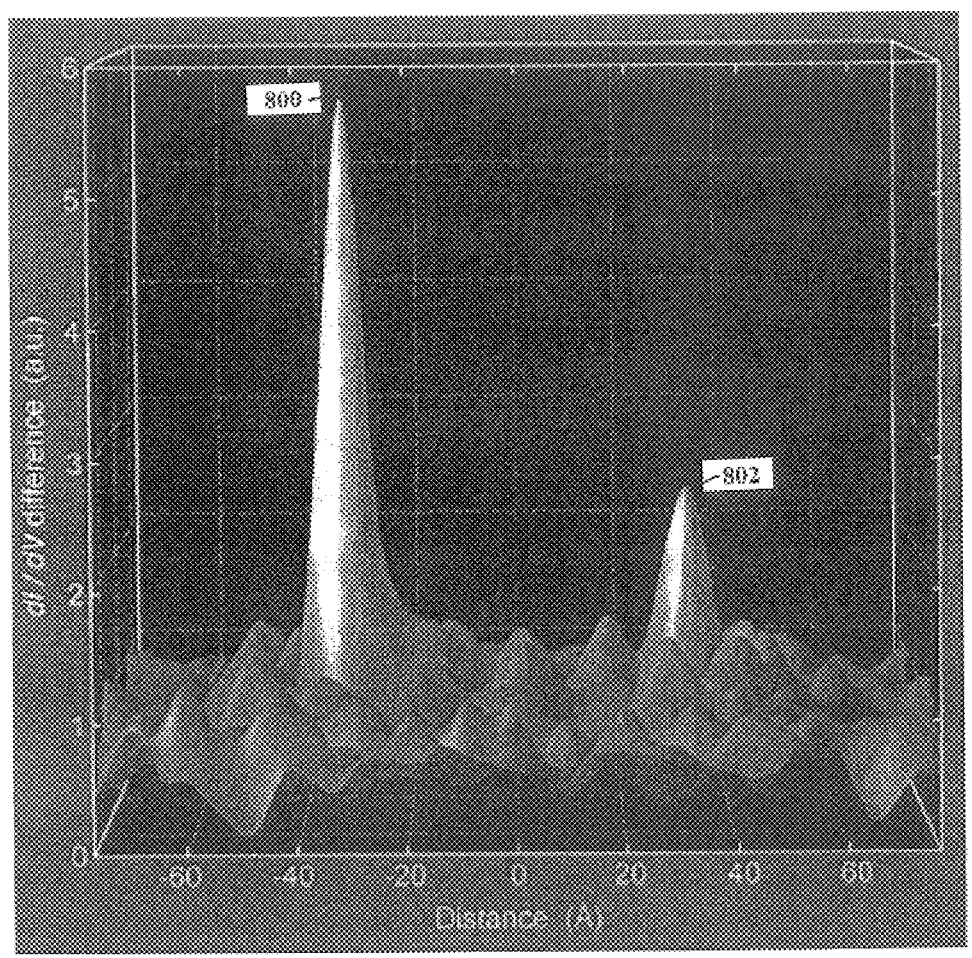
FIG. 11 is a conductivity difference plot of the elliptical quantum corral resonator illustrating the transmission of analog information encoded in the spectral signature of a cobalt atom according to a preferred embodiment of the present invention.

Referring now to FIG. 11, a plot of resonator 300 conductivity difference, illustrating the transmission of analog information encoded in the spectral signature of cobalt atom 600 is shown, according to a preferred embodiment of the present invention. FIG. 11 is a perspective plot derived from FIG. 8 data. The quality of interfocus transmission is depicted; the signal from the destination "phantom" atom (receiver 106) at right focus 204 is roughly one-third the magnitude of the signal arising from the "real" source atom 600 (transmitter 102) at left focus 202. The fidelity of the transfer can be further examined by comparing the spectra obtained over the occupied left focus 202 and the empty right focus 204.

Figure 12B:
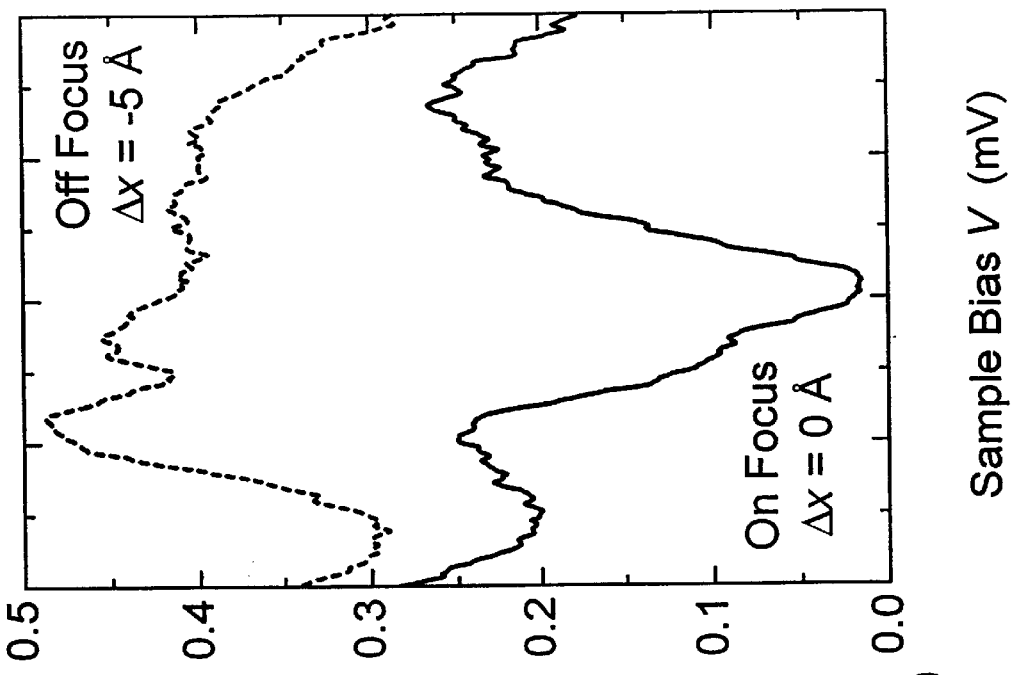
FIGS. 12A and 12B are plots of conductivity of the elliptical quantum corral resonator versus sample bias voltage according to a preferred embodiment of the present invention.
Figure 12A:
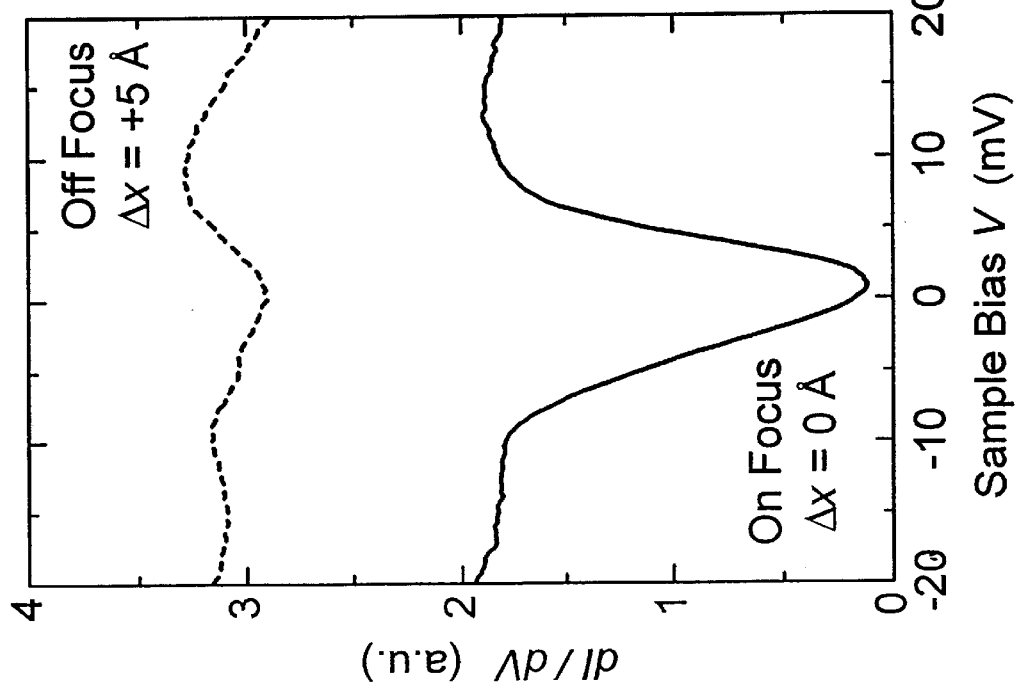

Referring now to FIGS. 12A and 12B, plots of resonator 300 conductivity versus sample bias voltage are shown, according to a preferred embodiment of the present invention. In this case, conductivity is measured by the STM in open-loop mode. The signal detected at receiver 106 is highly correlated with the signal from transmitter 102, as shown by very similar line widths, line shapes, and zero-bias offsets (solid lines). Further, the detected signal is confined to a region of space of comparable length scale to the source signal, as shown by comparison of data taken on the foci (202 and 204) versus data taken 5 Å off the foci (dashed lines) which show a considerably weakened Kondo resonance.

Referring now to FIG. 13, a topographic STM image of a circular quantum corral resonator 1300 is shown according to a second embodiment of the invention. Instead of an elliptically-shaped corral as used in the preferred embodiment, the second embodiment uses circular resonator 1300 to define two spatially overlapping quantum states 1400 and 1402. A key advantage of the second embodiment becomes evident by considering the two degenerate orthogonal quantum states 1400 and 1402 of resonator 1300, each having an angular momentum quantum number of 1.

Figure 14A:
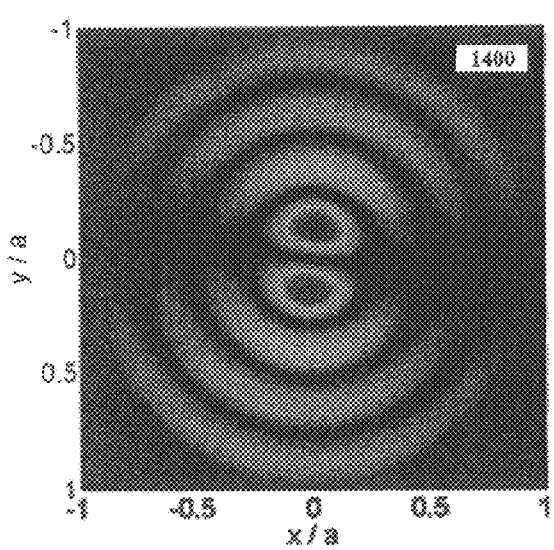
FIGS. 14A and 14B are schematic diagrams of the eigenmodes of the circular quantum corral resonator according to the second embodiment of the present invention.
Figure 14B:
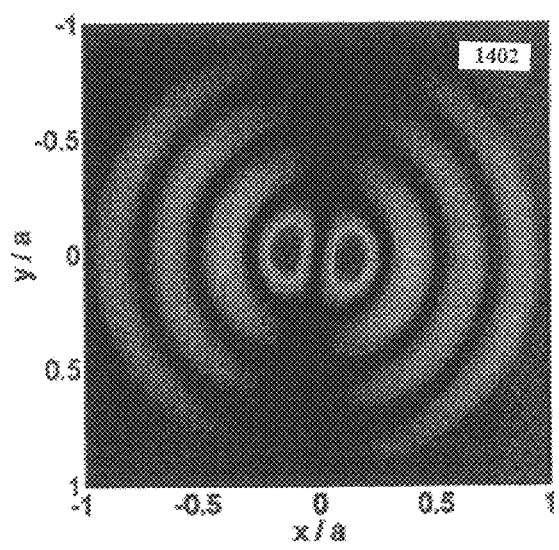

Referring now to FIGS. 14A and 14B, schematic diagrams of the eigenmodes of resonator 1300 are shown, according to the second embodiment of the present invention. Resonator 1300 has a radius of 63.5 Å in this embodiment. The quantum states 1400 and 1402 depicted both correspond to one unit of angular momentum (e.g., 1=1.0), and are each peaked in two places near the center of resonator 1300. Resonator 1300 may be viewed as a very low eccentricity ellipse 200, with foci close to its center.

Normally, due to the rotational symmetry of circular resonator 1300, such quantum states 1400 and 1402 will appear as concentric rings when a probability distribution is measured. However, the symmetry may be broken intentionally to "lock in" a particular orientation of the pair of quantum states 1400 and 1402. In this case, a first cobalt atom 1404 (not shown) serving as a transmitter 102 is placed off center at a radial distance corresponding to the peaks in the 1=1 quantum state 1400 to break the rotational symmetry, as depicted in FIG. 14A. Calculated magnitudes of the resulting quantum states 1400 and 1402 present near the Fermi energy of resonator 1300 are shown in FIGS. 14A and 14B.

The orthogonal quantum state 1402 shown in FIG. 14B thus now has lobes rotated ninety degrees with respect to quantum state 1400 shown in FIG. 14A. One wavefunction's nodes are thus located at the other wavefunction's antinodes. The quantum state 1402 shown in FIG. 14B may be used for a separate and distinct information transfer channel because the quantum states 1400 and 1402 depicted in FIGS. 14A and 14B will always remain orthogonal to each other. Transmitter 102 is located at a position corresponding to an antinode in quantum state 1400 of the channel over which it is intended to transmit information.

Referring now to FIG. 15, a rendered STM image of single-channel communication using quantum state 1400 of resonator 1300 is shown according to the second embodiment of the present invention. FIG. 15 is created from data gathered according to the differential conductivity methods described with respect to FIGS. 5 through 10 above. The cobalt atom 1404 serving as transmitter 102 projects its Kondo signature to the opposing 1=1 eigenstate lobe or "focus", hence the geometry depicted in FIG. 14A may be used for information transfer as described in the preferred embodiment. A receiver 106 should be placed at the antinode of quantum state 1400 being altered by cobalt atom 1404 for optimum information transfer.

Figure 16:
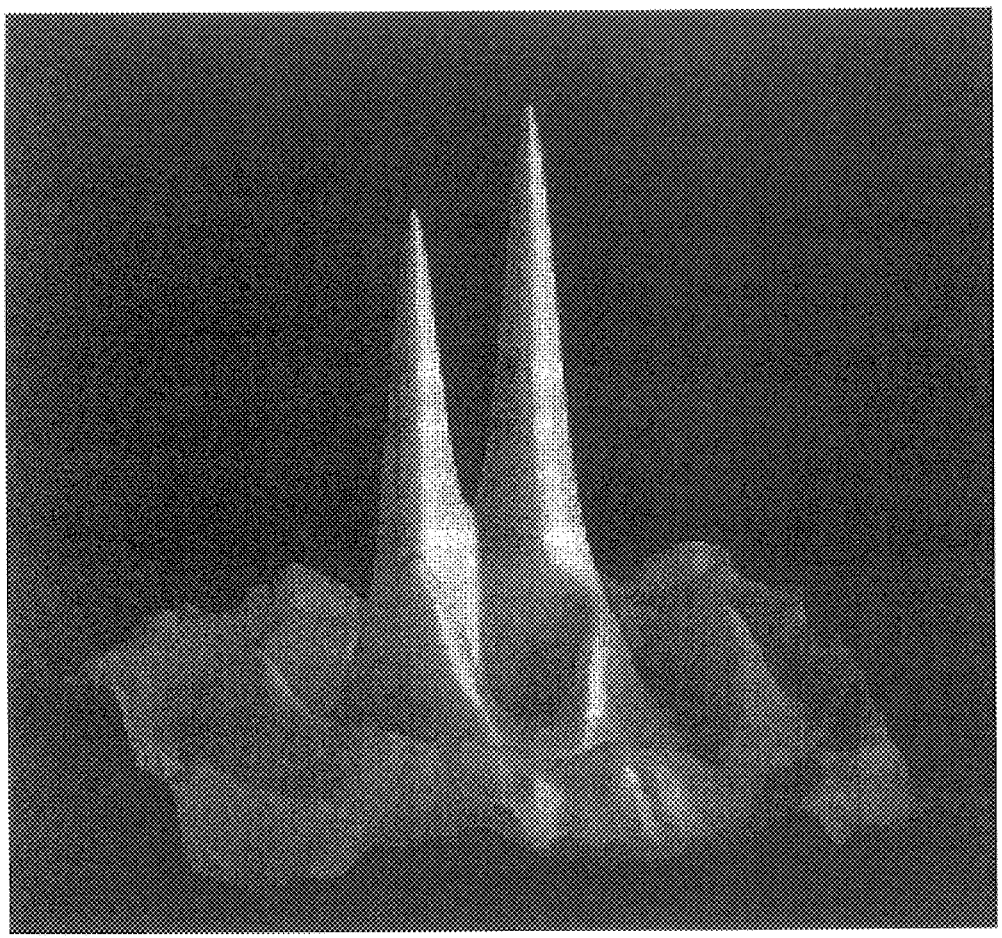
FIG. 16 is an STM image of cross-channel communication using orthogonal eigenmodes of the circular quantum corral resonator according to the second embodiment of the present invention.

Referring now to FIG. 16, a rendered STM image of dual-channel communication using orthogonal quantum states 1400 and 1402 of resonator 1300 is shown according to the second embodiment of the present invention. A second cobalt atom 1406 (not shown) serving as a second transmitter 1500 is placed an identical distance away from the center of resonator 1300 but at a position ninety degrees away from the location of the first cobalt atom 1404. Second transmitter 1500 projects its Kondo signature to its own opposing "focus" depicted in FIG. 14B.

In other words, second transmitter 1500 is located at a position corresponding to an antinode in quantum state 1402 of the channel over which it is intended to transmit information, and at a node in quantum state 1400 over which it is not intended to transmit information. Similarly, a second receiver 1502 should be placed at the antinode of the quantum state 1402 being modulated by second transmitter 1500 and at a node in quantum state 1400 over which it is not intended to receive information. This embodiment of the present invention therefore illustrates the exploitation of the orthogonality of quantum wavefunctions to enable multiple channels of information to be transferred simultaneously through the same volume of space without crosstalk. Quantum states 1400 and 1402 are designed to have the property of having locations where one state's antinode is at the position of the node of the other state, and vice versa.

Figure 17:
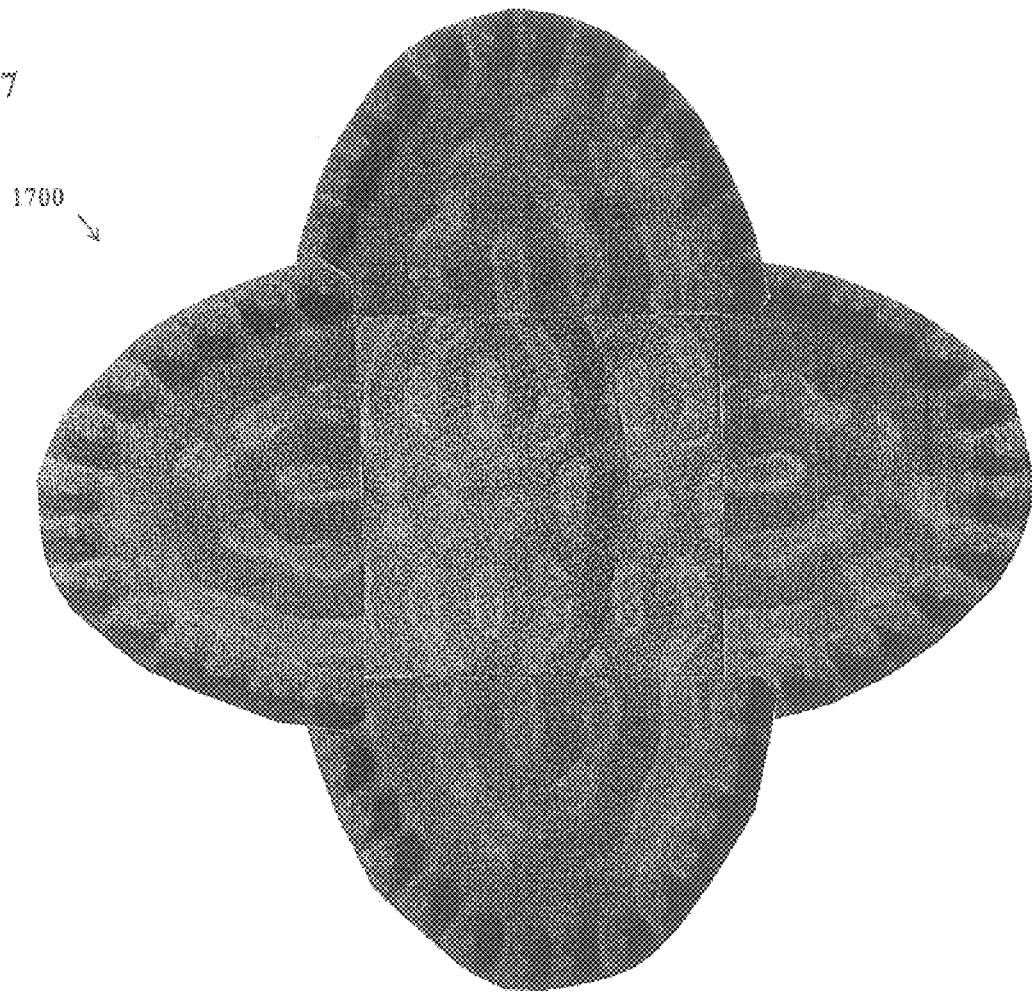
FIG. 17 is a schematic diagram of a pair of interdigitated elliptical quantum corral resonators simultaneously communicating information through two independent channels in the same region of space according to an alternate embodiment of the present invention.

Other geometries may also be candidates for multiple channel communication systems. For example, in FIG. 17 a schematic diagram of a pair of crossed elliptical quantum corral resonators 1700 is shown. Each ellipse in FIG. 17 may have its own transmitter 102 and receiver 106 simultaneously communicating information through two independent channels in the same region of space. Similarly, single resonators having nearly degenerate eigenstates may also perform the same function. At least one quantum state 104 is required for each channel of information.

The present invention is not limited to systems having the same number of transmitters 102 as receivers 106. Similarly, more than two information transfer channels may be incorporated into a communication system; for example, different types of quantum state 104 modulation and detection may be simultaneously employed in a particular transfer channel. Information may therefore be simultaneously transferred through a transfer channel in either direction.

Further, computer software may assist in the design of resonators to produce a particular set of quantum states 104 desired for a particular communication system. For example, a designer may specify the initial eccentricity and length of an elliptical resonator and the distribution of nodes and antinodes desired. A computer program may then compute the quantum state 104 density distributions available in the resonator given those parameters, and may then compare the coordinates of the computed nodes and antinodes to the distribution desired. The computer program may then selectively alter the eccentricity and length (or other relevant parameters) so that the resulting quantum states 104 better fit the designer's specifications.

Figure 18:
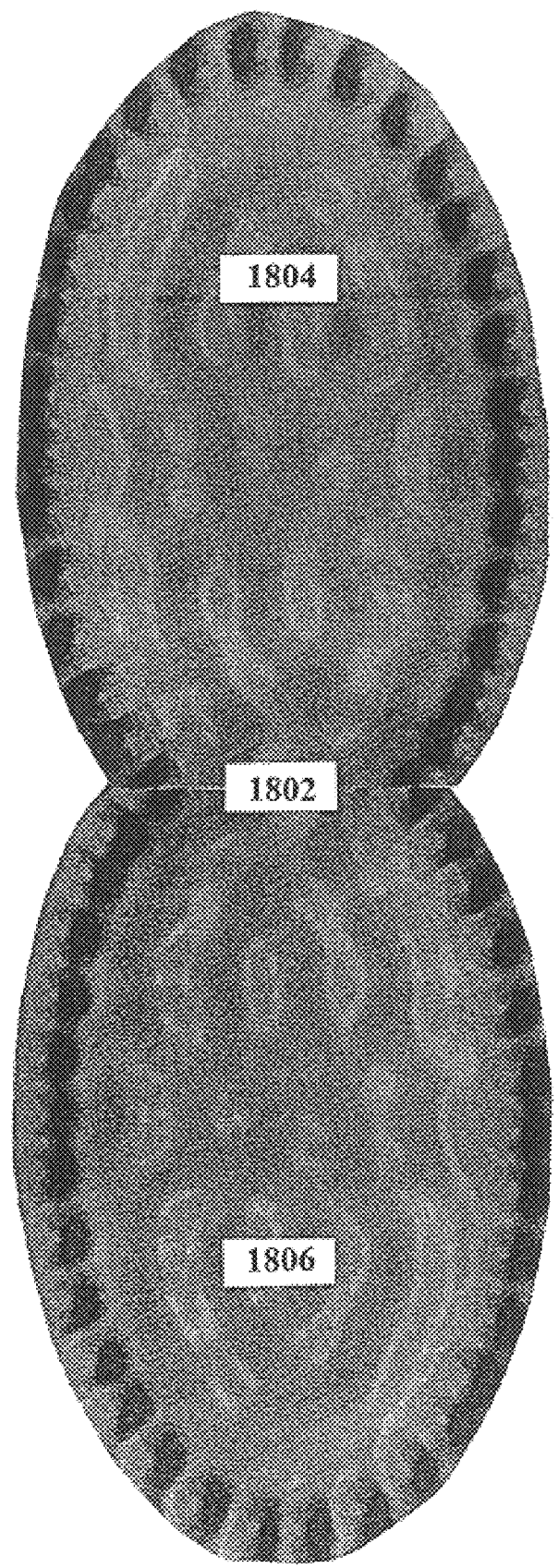
FIG. 18 is a schematic diagram of a pair of interconnected elliptical quantum corral resonators sharing a common focus according to a third embodiment of the present invention.

Referring now to FIG. 18, a schematic diagram of a pair of interconnected elliptical quantum corral resonators 1800 sharing a common focus 1802 is shown according to a third embodiment of the present invention. This structure is designed to have density distributions that are highly peaked in three locations: common focus 1802, upper focus 1804, and lower focus 1806. Transmitters and receivers placed at these locations may modulate and detect modulations, respectively, imposed upon the same quantum state 104 or set of quantum states 104. The pair 1800 effectively form a processor 1808 that may perform several different functions depending on the placement of transmitters 102 and receivers 106 within its confines.

First, if a transmitter 102 is placed at common focus 1802, it will effectively project its quantum mechanical signal to receivers 106 placed at both upper focus 1804 and lower focus 1806 (RTR structure) by modulating quantum states 104 spanning the space within processor 1808. Information arriving at transmitter 102 may therefore be replicated into two identical copies, each arriving simultaneously at spatially distinct receiver locations due to the symmetry of processor 1808. By placing receivers 106 at upper focus 1804 and lower focus 1806, the two copies of the modulating information may be transferred out of processor 1808 with no relative phase difference, for further separate use.

Second, if a transmitter 102 is placed at upper focus 1802 and receivers 106 are placed at both common focus 1802 and lower focus 1806 (TRR structure), copies of the transmitting information having different received values dependent on the quantum state density at each receiver 106 may be transferred out of processor 1808. The signal received at common focus 1802 may for example be an attenuated version of the signal applied by transmitter 102. The signal received at lower focus 1806 may be a differently-attenuated version of the signal applied by transmitter 102 due to the asymmetric placement of receivers 106. Although lower focus 1806 is farther from transmitter 102 than is common focus 1802, this difference in distance does not necessarily mean that the signal received at lower focus 1806 is more attenuated than the signal received at common focus 1802; the relative values are determined by the specific design of quantum states 104 in processor 1808.

Third, if a transmitter 102 is placed at upper focus 1804, a receiver 106 is placed at common focus 1802, and a second transmitter 1810 is placed at lower focus 1804 (TRT structure), processor 1808 effectively becomes a multifunction gate. The output of receiver 106 will be at some reference value (e.g. zero) if neither transmitter is generating a signal. If exactly one of the transmitters is actively modulating quantum state 104, receiver 106 will output a corresponding signal, regardless of which transmitter (102 or 1810) is active due to the symmetry of processor 1808. However, if both transmitters 102 and 1810 are active, receiver 106 will produce a different output signal than it would if only one or neither transmitter were activated, due to the dual modulation of quantum state 104.

For example, suppose that transmitter 102 and second transmitter 1810, operating separately, produce a signal at receiver 106 having one third the original transmitted signal amplitude. Further, suppose that when transmitter 102 and second transmitter 1810 operate simultaneously, they together produce a signal at receiver 106 having two thirds the original transmitted signal amplitude. Level-detecting circuitry may translate the received signal to effectively enable processor 1808 to behave as a logic gate. Suppose typically that a received value of less than one third produces a logic "0" output. If a received threshold value of one third is required to produce a logic "1" output, processor 1808 behaves as an OR gate. Alternately, if a threshold value of two thirds is required to produce a logic "1" output, processor 1808 then behaves as an AND gate. Similarly, if a threshold value of one third is required to produce a logic "1" output, but a received signal value of two thirds then causes a logic "0" output, processor 1808 then behaves as an exclusive-OR (XOR) gate. If one transmitter is always active (e.g. an atom exists at an antinode) in an XOR gate, a logical inverter is the effective result.

Fourth, if a receiver 106 is placed at upper focus 1804 and transmitters 102 and 1810 are placed at the common focus 1802 and lower focus 1806 (RTT structure), processor 1808 becomes a different multifunction gate. The output of receiver 106 will be at some reference value (e.g. zero) if neither transmitter is generating a signal. If exactly one of the transmitters (102 or 1810) is actively modulating quantum state 104, receiver 106 will output a signal that is dependent both on the transmitted signal and on which of the transmitters (102 or 1810) is active. However, if both transmitters 102 and 1810 are active, receiver 106 will produce a different output signal than it would in all other cases; this different output signal will not necessarily simply be a summation of both transmitted signals, even factoring in that one transmitter is farther away and may therefore have a different contribution to the overall modulation. Transmitter 102 at common focus 1802 may for example act to partially block or reflect the signal from second transmitter 1810 at lower focus 1806. Transfer gates, summers, mixers, and NAND gates may thus be readily constructed by those ordinarily skilled in the art.

Additionally, quantum states 104 may be designed to have more than three density distribution peaks. The additional peaks may be used as locations for additional transmitters enabling formation of logical gates with an arbitrary number of inputs.

Alternately, control transmitters may shift the density distribution pattern of quantum states 104 to deliberately move the nodes and antinodes to different spatial locations corresponding to different sets of transmitters and receivers. In this manner, the invention may select different combinations of transmitters and receivers for information transfer, thus the invention may effectively serve as a multiplexer (MUX) device or programmable switching array.

Referring now to FIG. 19, a schematic diagram of a pair of parabolic electron reflectors 1900 and 1902 forming a communication system is shown, according to a fourth embodiment of the present invention. A parabola is a locus of points equidistant from a fixed line and a fixed point (focus) not on the line. If a transmitter 102 is placed at the focus 1904 of first parabolic electron reflector 1900 and a receiver 106 is placed at the focus 1906 of second parabolic electron reflector 1902, information may be transferred some distance between the reflectors through quantum states 104 operably connecting each focus. Some of the modulation will escape, probably more so than in the case of the preferred embodiment because the quantum states 104 are not as well confined. However, this fourth embodiment illustrates that open geometries may also transfer information via modulation of quantum states.

Thus, with the unique and nonobvious structure and method of the present invention, the limitations placed on conventional microelectronics are overcome, and a new paradigm for information transfer using engineered quantum states is provided.

While the invention has been described in terms of exemplary embodiments, those skilled in the art will recognize that the invention can be practiced with modification within the spirit and scope of the appended claims.

We claim:

1. A computer program product comprising a computer usable medium having computer readable program code means embodied in said medium for causing a program to execute on a computer that performs resonator structure optimization, said computer readable program code means comprising:

a first computer readable program code means for causing the computer to compute a distribution of nodes and antinodes of a quantum wavefunction defined by a resonator structure;

a second computer readable program code means for causing the computer to compare said computed distribution with a specified desired distribution of quantum wavefunction nodes and antinodes; and a third computer readable program code means for causing the computer, if specified stop criteria are not met, to modify said resonator structure in response to said computing and comparing steps and to repeat execution of all said code means.

2. A computer-implemented method for optimizing resonator structures, comprising the steps of:

computing a distribution of nodes and antinodes of a quantum wavefunction defined by a resonator structure;

comparing said computed distribution with a specified desired distribution of quantum wavefunction nodes and antinodes; and if specified stop criteria are not met, modifying said resonator structure in response to said computing and comparing steps and repeating execution of all said steps.

3. The method of claim 2 wherein said computing step uses a hard-wall box approximation.

4. The method of claim 2 wherein said computing step includes computation of the Kondo effect.

5. The method of claim 2 wherein said desired distribution corresponds to a desired information transfer function.

6. The method of claim 5 wherein said stop criteria include constraints on maximum overall power dissipation.

7. The method of claim 2 wherein said modification is to break the symmetry of said resonator structure.

8. The method of claim 2 wherein said modification is to open the geometry of said resonator structure.

9. A system for optimizing resonator structures, comprising:

a resonator structure defining a distribution of nodes and antinodes of a quantum wavefunction;

a specified desired distribution of quantum wavefunction nodes and antinodes;

a comparator that compares said desired distribution with said defined distribution;

a modifier that modifies said resonator structure in response to said comparison; and a terminator that causes said comparator and said modifier to iterate until specified stop criteria are met.

10. The system of claim 9 wherein said desired distribution corresponds to a desired information transfer function.

11. The system of claim 10 wherein said stop criteria include constraints on maximum overall power distribution.

12. The system of claim 9 wherein said resonator structure includes at least one quantum corral.

13. The system of claim 12 wherein said quantum corral is initially elliptical.

14. The system of claim 12 wherein said quantum corral is initially circular.

15. The system of claim 12 wherein said resonator structure includes at least one electron reservoir.

16. The system of claim 9 wherein said modification is to break the symmetry of said resonator structure.

17. The system of claim 9 wherein said modification is to open the geometry of said resonator structure.

18. The system of claim 9 wherein said defined distribution is measured with an STM.

19. The system of claim 9 wherein said modifier is an STM tip.

20. The system of claim 9 wherein said resonator structure and said defined distribution are mathematically simulated.

* * * * *